(12) United States Patent
Matsumoto

(10) Patent No.: US 8,802,976 B2
(45) Date of Patent: Aug. 12, 2014

(54) DYE-SENSITIZED SOLAR CELL

(71) Applicant: Fujikura Ltd., Tokyo (JP)

(72) Inventor: Daisuke Matsumoto, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/962,108

(22) Filed: Aug. 8, 2013

(65) Prior Publication Data

US 2013/0319526 A1 Dec. 5, 2013

Related U.S. Application Data

(63) Continuation of application No. PCT/JP2012/053026, filed on Feb. 9, 2012.

(30) Foreign Application Priority Data

Feb. 9, 2011 (JP) .................................. 2011-026593

(51) Int. Cl.
*H01L 31/052* (2014.01)

(52) U.S. Cl.
USPC .......................................... 136/263; 136/246

(58) Field of Classification Search
None
See application file for complete search history.

(56) References Cited

U.S. PATENT DOCUMENTS

2011/0240087 A1* 10/2011 Sasaki ........................... 136/244
2012/0132276 A1*  5/2012 Bae et al. ...................... 136/256

FOREIGN PATENT DOCUMENTS

| JP | 10-255863 A | 9/1998 |
| JP | 2004-296373 A | 10/2004 |
| JP | 2004-311197 A | 11/2004 |
| JP | 2012-64485 A | 3/2012 |

* cited by examiner

*Primary Examiner* — Jayne Mershon
(74) *Attorney, Agent, or Firm* — Sughrue Mion, PLLC

(57) ABSTRACT

The present invention is a dye-sensitized solar cell including a working electrode having a conductive substrate that is capable of transmitting light, and a porous oxide semiconductor layer that is provided on the conductive substrate; a counter electrode that is provided to face the porous oxide semiconductor layer of the working electrode; a photosensitizing dye that is supported in the porous oxide semiconductor layer of the working electrode; and an electrolyte that is disposed between the working electrode and the counter electrode, in which solar cell the average particle size of the entirety of the semiconductor particles that constitute the porous oxide semiconductor layer is 100 nm or less, the electrolyte contains inorganic particles and is gelled by the inorganic particles, and the reflectance of the electrolyte is higher than the reflectance of the porous oxide semiconductor layer.

14 Claims, 5 Drawing Sheets

DYE-SENSITIZED SOLAR CELL

CROSS REFERENCE TO RELATED APPLICATIONS

This application is a Continuation of National Stage of International Application No. PCT/JP2012/053026 filed Feb. 9, 2012, claiming priority based on Japanese Patent Application No. 2011-026593 filed Feb. 9, 2011, the contents of all of which are incorporated herein by reference in their entirety.

TECHNICAL FIELD

The present invention relates to a dye-sensitized solar cell.

BACKGROUND ART

In recent years, attention has been paid to dye-sensitized solar cells as photoelectric conversion devices, since high photoelectric conversion efficiency may be obtained at low cost.

A dye-sensitized solar cell generally includes a working electrode, a counter electrode, a photosensitizing dye that is supported in the working electrode, and an electrolyte that is disposed between the working electrode and the counter electrode.

In regard to such dye-sensitized solar cells, there is a demand for a further improvement in the photoelectric conversion characteristics, and various studies are in progress for that purpose.

For example, Patent Document 1 discloses a dye-sensitized solar cell which includes a glass substrate; an electrode that is provided on the back surface of the glass substrate; a light absorbing particle layer that is formed on the lower surface of the electrode by depositing semiconductor fine particles having a particle size of 80 nm or less and having a dye adsorbed thereto; an electrolyte section that includes the light absorbing particle layer and is provided on the lower surface of the electrode; a counter electrode that is provided on the lower surface of the electrolyte section; a high refractive index material thin film that is provided between the electrode and the light absorbing particle layer; and a light reflecting particle layer that is provided on the lower surface of the light absorbing particle layer and is formed by depositing a high refractive index material particles having a particle size of 200 nm to 500 nm. In this dye-sensitized solar cell, when sunlight is transmitted through the glass substrate, the electrode and the high refractive index material thin film, and enters the light absorbing particle layer, the light that is transmitted through the light absorbing particle layer is reflected at the light reflecting particle layer, and of the light that has been reflected at the light reflecting particle layer, the portion of light that is transmitted through the light absorbing particle layer and returned to the high refractive index material thin film is totally reflected at the high refractive index material thin film.

As a result, light is entrapped in the light absorbing particle layer, and an enhancement of the photoelectric conversion characteristics is promoted.

Patent Document 1: Japanese Patent Application Laid-Open (JP-A) No. 10-255863

SUMMARY OF INVENTION

Problem to be Solved by the Invention

However, the dye-sensitized solar cell described in Patent Document 1 as described above has the following problems.

That is, in the dye-sensitized solar cell described in Patent Document 1, a light reflecting particle layer is provided on the counter electrode side with respect to the light absorbing particle layer. This light reflecting particle layer is to reflect the light that has been transmitted through the light absorbing particle layer and to thereby return the light to the light absorbing particle layer. Therefore, the light reflecting particle layer is considered to contribute to an enhancement of the photoelectric conversion characteristics. However, in this case, as a light reflecting particle layer is provided on the counter electrode side with respect to the light absorbing layer, it is necessary to increase the distance between the electrode and the counter electrode, and this deteriorates the photoelectric conversion characteristics. Therefore, in the dye-sensitized solar cell described in Patent Document 1, the effect of enhancing the photoelectric conversion characteristics and the effect of deteriorating the photoelectric conversion characteristics cancel each other, and it is difficult to effectively enhance the photoelectric conversion characteristics.

Accordingly, there has been a demand for a dye-sensitized solar cell having excellent photoelectric conversion characteristics.

The present invention was achieved in view of the circumstances described above, and it is an object of the invention to provide a dye-sensitized solar cell having excellent photoelectric conversion characteristics.

Means for Solving Problem

The inventors of the present invention conducted thorough investigations in order to solve the problems described above, and as a result, it was found that the problems described above can be solved by the following invention.

That is, the present invention is a dye-sensitized solar cell including a working electrode having a conductive substrate capable of transmitting light, and a porous oxide semiconductor layer that is provided on the conductive substrate; a counter electrode that is provided to face the porous oxide semiconductor layer of the working electrode; a photosensitizing dye that is supported in the porous oxide semiconductor layer of the working electrode; and an electrolyte that is disposed between the working electrode and the counter electrode, wherein the average particle size of the entirety of the semiconductor particles that constitute the porous oxide semiconductor layer is 100 nm or less, the electrolyte contains inorganic particles and is gelled by the inorganic particles, and the reflectance of the electrolyte is larger than the reflectance of the porous oxide semiconductor layer.

According to this dye-sensitized solar cell, for example, sunlight is transmitted through the conductive substrate of the working electrode and enters the porous oxide semiconductor layer. At this time, the average particle size of the entirety of the semiconductor particles that constitute the porous oxide semiconductor layer is 100 nm or less, and the surface area of the porous oxide semiconductor layer becomes very large. Therefore, the amount of the photosensitizing dye that is supported in the porous oxide semiconductor layer can be increased. Accordingly, light is sufficiently absorbed by the photosensitizing dye that is supported in the porous oxide semiconductor layer. Light that has not been absorbed in the porous oxide semiconductor layer and has leaked from the porous oxide semiconductor layer, enters the electrolyte. At this time, since the reflectance of the electrolyte is larger than the reflectance of the porous oxide semiconductor layer, the light that has entered the electrolyte is sufficiently reflected at the electrolyte and is returned to the porous oxide semiconductor layer. Furthermore, the electrolyte scatters the light that has been transmitted through the porous oxide semiconductor layer, and returns the light to the porous oxide semiconductor layer. For this reason, it is not necessary to provide a light reflecting particle layer which is formed on the counter electrode side of the porous oxide semiconductor layer by depositing high refractive index material particles, and reflects the light that has been transmitted through the porous oxide semiconductor layer to return the light to the porous oxide semiconductor layer. Therefore, the distance between the working electrode and the counter electrode can be reduced. Therefore, the dye-sensitized solar cell of the present invention can have excellent photoelectric conversion characteristics. Furthermore, since the electrolyte is gelled by inorganic particles, fluidity of the electrolyte is sufficiently decreased. For this reason, even in the case where the dye-sensitized solar cell is installed such that the conductive substrate is inclined with respect to the horizontal plane, unlike the case where the electrolyte is liquid, uneven distribution of inorganic particles in the electrolyte can be sufficiently suppressed, and the light that is transmitted through the porous oxide semiconductor layer can be reflected evenly.

The dye-sensitized solar cell described above is useful in the case where the reflectance of the counter electrode is lower than the reflectance of the electrolyte.

That is, when the reflectance of the counter electrode is lower than the reflectance of the electrolyte, the light that has entered the counter electrode from the porous oxide semiconductor layer through the electrolyte is not sufficiently reflected at the counter electrode. Therefore, when inorganic particles are not included in the electrolyte, there is almost no chance of the light that has been reflected at the counter electrode being returned again to the porous oxide semiconductor layer, and the counter electrode hardly exhibits the function of returning the light that has leaked from the porous oxide semiconductor layer to the porous oxide semiconductor layer. In contrast, even if the reflectance of the counter electrode is lower than the reflectance of the electrolyte, as long as inorganic particles are included in the electrolyte as in the case of the present invention, the light that has entered the electrolyte from the porous oxide semiconductor layer is effectively reflected at the electrolyte. Therefore, the dye-sensitized solar cell of the present invention is useful in the case where the reflectance of the counter electrode is lower than the reflectance of the electrolyte.

In the dye-sensitized solar cell described above, it is preferable that the semiconductor particles that constitute the porous oxide semiconductor layer be oxide semiconductor particles, and these oxide semiconductor particles be composed of a material that is different from that of the inorganic particles, or have a crystal form that is different from that of the inorganic particles.

In this case, the photoelectric conversion characteristics can be further enhanced as compared with the case where the inorganic particles are the same oxide semiconductor particles as the oxide semiconductor particles used in the porous oxide semiconductor layer, and have the same crystal form.

In the dye-sensitized solar cell, it is preferable that the inorganic particles be formed from oxide semiconductor particles.

In this case, unlike the case where the inorganic particles are formed from electrically conductive particles, short circuits between the working electrode and the counter electrode can be sufficiently prevented. Furthermore, unlike the case where the inorganic particles are formed from insulating particles, the oxide semiconductor particles themselves can cause electrons to flow. That is, the oxide semiconductor particles themselves can serve as conductive paths. Therefore, the photoelectric conversion efficiency is further enhanced.

In the dye-sensitized solar cell, it is preferable that the average particle size of the inorganic particles be 5 nm to 1,000 nm.

When the average particle size of the inorganic particles is in the range of 5 nm to 1,000 nm, the reflection efficiency for visible light and near-infrared light is further increased as compared with the case where the average particle size of the inorganic particles is not in this range.

In the dye-sensitized solar cell, it is preferable that the average particle size of the inorganic particles be 10 nm to 400 nm.

When the average particle size of the inorganic particles is in the range of 10 nm to 400 nm, reflection efficiency for visible light and near-infrared light is further increased as compared with the case where the average particle size of the inorganic particles is not in this range.

In the dye-sensitized solar cell, it is preferable that the content of the inorganic particles in the electrolyte be 10% to 90% by mass.

When the content of the inorganic particles in the electrolyte is in the range of 10% to 90% by mass, superior photoelectric conversion characteristics are obtained as compared with the case where the content of the inorganic particles is not in this range.

In the dye-sensitized solar cell, it is preferable that the content of the inorganic particles in the electrolyte be 30% to 70% by mass.

When the content of the inorganic particles in the electrolyte is in the range of 30% to 70% by mass, superior photoelectric conversion characteristics are obtained as compared with the case where the content of the inorganic particles is not in this range.

In the dye-sensitized solar cell, it is preferable that two or more kinds of inorganic particles having different average particle sizes be included in the electrolyte.

In this case, since inorganic particles having a smaller average particle size sufficiently fill in the gaps between inorganic particles having a larger average particle size, the light that has entered the electrolyte layer from the porous oxide semiconductor layer is fully reflected and is thereby returned to the porous oxide semiconductor layer. Furthermore, since inorganic particles having different average particle sizes are included in the electrolyte, light having wavelengths that respectively correspond to the average particle sizes of the inorganic particles can be sufficiently reflected.

In the dye-sensitized solar cell, it is preferable that the difference between the reflectance of the electrolyte and the reflectance of the porous oxide semiconductor layer be 10% to 70%.

When the difference between the reflectance of the electrolyte and the reflectance of the porous oxide semiconductor layer is in the range of 10% to 70%, superior photoelectric conversion characteristics are obtained as compared with the case where the difference in the reflectance is not in this range.

It is preferable that the dye-sensitized solar cell further include a sealing portion that connects the working electrode and the counter electrode around the electrolyte, and that the distance between the conductive substrate and the counter electrode in the porous oxide semiconductor layer be shorter than the distance between the conductive substrate and the counter electrode in the sealing portion.

Here, it is preferable that the semiconductor particles that constitute the porous oxide semiconductor layer be formed of titanium oxide, and that the inorganic particles be formed of silica.

In this case, the photoelectric conversion characteristics can be further enhanced.

In this case, since the distance between the conductive substrate and the counter electrode in the porous oxide semiconductor layer that contributes to power generation becomes shorter, superior photoelectric conversion characteristics are obtained in the dye-sensitized solar cell.

In the dye-sensitized solar cell, it is preferable that the counter electrode be flexible. When the counter electrode is flexible, as the counter electrode bends to become convex toward the working electrode side, the distance between the working electrode and the counter electrode can be reduced, and the photoelectric conversion characteristics can be further enhanced.

In the dye-sensitized solar cell, it is preferable that the counter electrode be flexible, the dye-sensitized solar cell further include a sealing portion that connects the working electrode and the counter electrode, and the cell space that is formed by the working electrode, the counter electrode and the sealing portion be at a pressure lower than 101325 Pa at 25° C.

When the cell space is at a pressure lower than 101325 Pa at 25° C., usually the cell space is brought to a negative pressure state relative to the outside air. At this time, if the counter electrode is flexible, the counter electrode bends to become convex toward the working electrode side, and the distance between the counter electrode and the working electrode can be further reduced. Therefore, the photoelectric conversion efficiency can be further enhanced.

Meanwhile, in the present invention, the average particle size of the entirety of the semiconductor particles that constitute the porous oxide semiconductor layer refers to the average particle size that is measured using an X-ray diffraction apparatus (XRD, fully automated, horizontal type, multi-purpose X-ray diffraction apparatus, SmartLab, manufactured by Rigaku Corp.).

Furthermore, in the present invention, when the average particle size of the inorganic particles is 1 nm to 100 nm, the average particle refers to the average particle size that is measured using an X-ray diffraction apparatus (XRD, fully automated, horizontal type, multi-purpose X-ray diffraction apparatus, SmartLab, manufactured by Rigaku Corp.). When the average particle size is greater than 100 nm, the average particle size refers to the average particle size that is measured using a transmission electron microscope (Scanning Electron Microscope: SEM).

Furthermore, in the present invention, when it is said that the counter electrode "is flexible", it is intended to mean that when the two edges (each having a width of 5 mm) on the longer side of a sheet-like counter electrode having a size of 50 mm×200 mm are horizontally fixed under a tension of 1 N in an environment at 20° C., and a weight load of 20 g is applied at the center of the counter electrode, the maximum deformation ratio of the deflection of the counter electrode exceeds 20%. Here, the maximum deformation ratio refers to the value calculated based on the following formula:

Maximum deformation ratio (%)=100×(maximum displacement/thickness of the sheet-like counter electrode).

Therefore, for example, when a sheet-like counter electrode having a thickness of 0.04 mm is bent by applying a weight load as described above, and when the maximum displacement reaches 0.01 mm, the maximum deformation ratio is 25%, and this sheet-like counter electrode comes to "be flexible".

Furthermore, the "reflectance" according to the present invention means the average value of reflectance in the wavelength region of 400 nm to 1,000 nm.

Moreover, in the present invention, "gelling" means a state in which the viscosity of the electrolyte is lost. Specifically, 10 cc of an electrolyte is introduced into a cylindrical glass tube having an inner diameter of 15 mm and a depth of 10 cm, and the glass tube is left to stand inversely at room temperature (23° C.), if all the electrolyte does not drop to the bottom after 15 minutes, this electrolyte is defined to have gelled.

Effect of the Invention

According to the present invention, a dye-sensitized solar cell having excellent photoelectric conversion characteristics is provided.

MODE(S) FOR CARRYING OUT THE INVENTION

Hereinafter, embodiments of the present invention will be described in detail with reference to the drawings. Meanwhile, in all of the diagrams, the same symbols will be assigned to the same or equivalent constituent elements, and overlapping descriptions will not be repeated.

Figure 1:
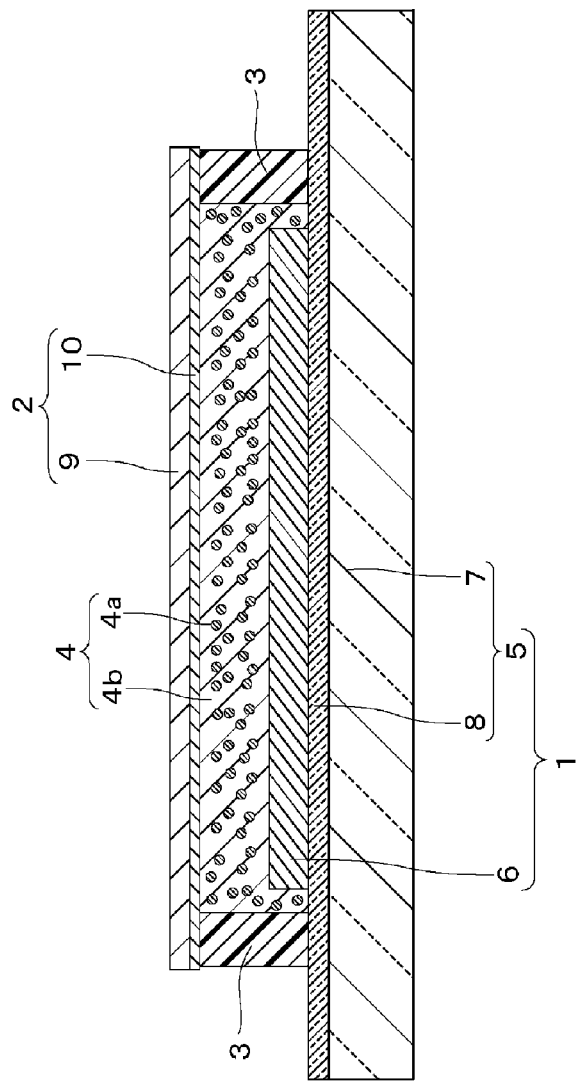
FIG. 1 is a cross-sectional diagram illustrating an embodiment of the dye-sensitized solar cell of the present invention.
Figure 2:
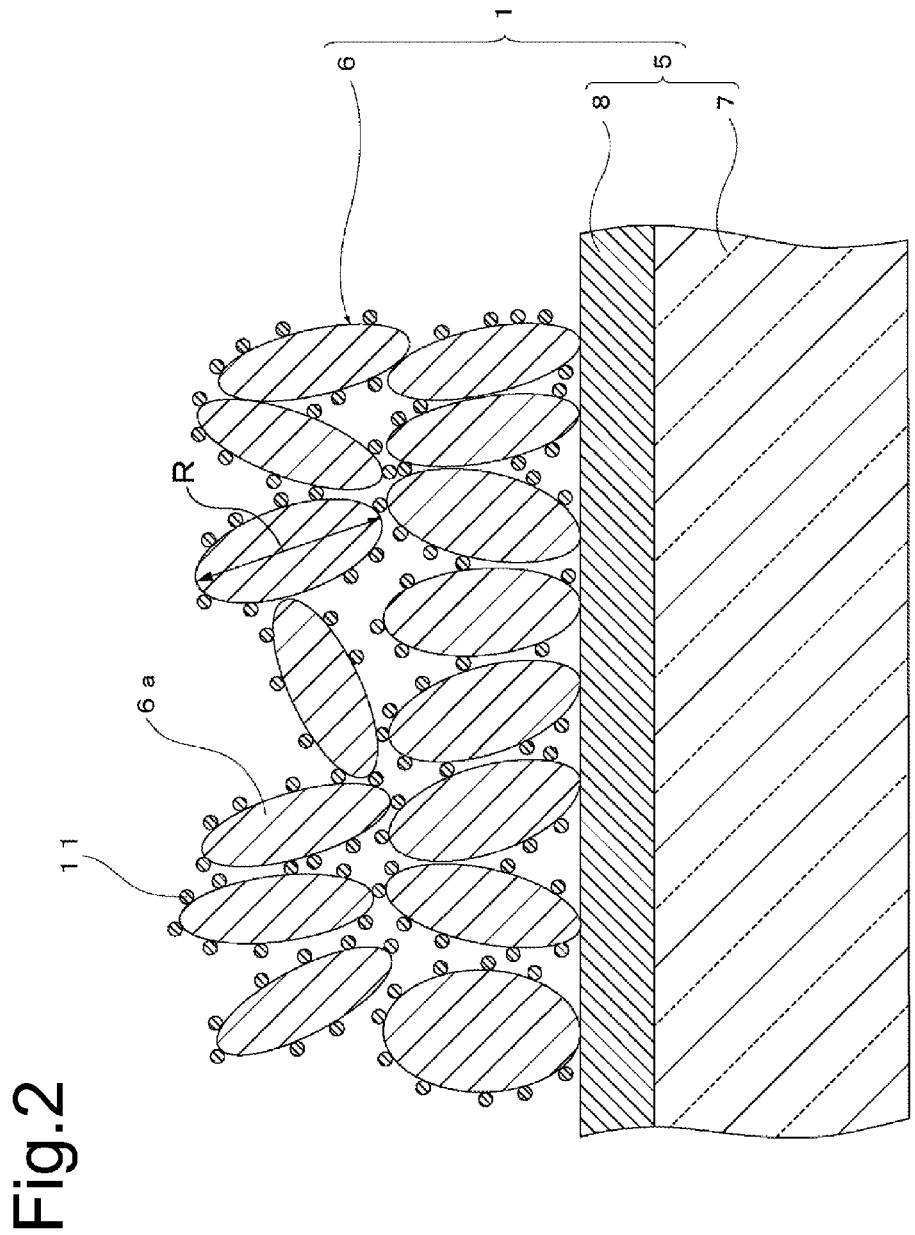
FIG. 2 is a cross-sectional diagram of a cut surface which schematically illustrating the working electrode supporting a photosensitizing dye in FIG. 1.
Figure 3:
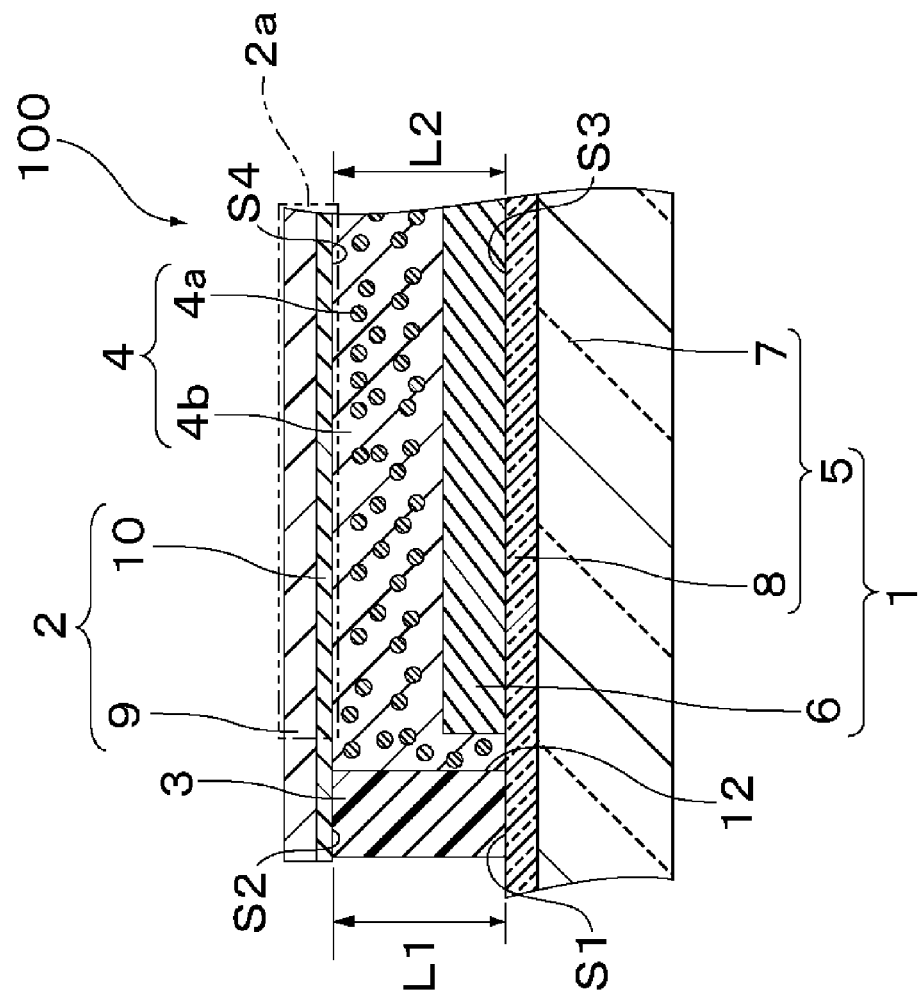
FIG. 3 is a diagram illustrating a portion of the dye-sensitized solar cell of FIG. 1.

FIG. 1 is a cross-sectional diagram illustrating a suitable embodiment of a dye-sensitized solar cell related to the present invention; FIG. 2 is a cross-sectional diagram of a cut surface schematically illustrating a working electrode that supports a photosensitizing dye in FIG. 1; and FIG. 3 is a diagram illustrating a portion of the dye-sensitized solar cell of FIG. 1.

As illustrated in FIG. 1, a dye-sensitized solar cell 100 includes a working electrode 1, and a counter electrode 2 that is disposed to face the working electrode 1. Here, the working electrode 1 includes a conductive substrate 5 that is capable of transmitting light, and a porous oxide semiconductor layer 6 that is provided on the conductive substrate 5.

As illustrated in FIG. 2, the porous oxide semiconductor layer 6 is composed of oxide semiconductor particles 6a. The average particle size of the entirety of the oxide semiconductor particles 6a that constitute the porous oxide semiconductor layer 6 is an average value of the particle size R of various oxide semiconductor particles 6a, and the value is 100 nm or less. The porous oxide semiconductor layer 6 is in direct contact with the electrolyte 4, and a photosensitizing dye 11 is supported in the porous oxide semiconductor layer 6. As illustrated in FIG. 1, the counter electrode 2 includes a counter electrode substrate 9, and an electrically conductive catalyst layer (catalyst film) 10 that is provided on the working electrode 1 side of the counter electrode substrate 9 and promotes a reduction reaction at the surface of the counter electrode 2.

Between the working electrode 1 and the counter electrode 2, a sealing portion 3 that connects the working electrode 1 and the counter electrode 2 is provided. Further, as illustrated in FIG. 3, in the dye-sensitized solar cell 100, the distance L1 between the conductive substrate 5 and the counter electrode 2 in the sealing portion 3 and the distance L2 between the conductive substrate 5 and the counter electrode 2 in the porous oxide semiconductor layer 6 are the same. Here, the distance L1 between the conductive substrate 5 and the counter electrode 2 in the sealing portion 3 means the interval between the interface S1 between the sealing portion 3 and the conductive substrate 5, and the interface S2 between the sealing portion 3 and the counter electrode 2. Furthermore, the distance L2 between the conductive substrate 5 and the counter electrode 2 in the porous oxide semiconductor layer 6 means the interval between the interface S3 between the porous oxide semiconductor layer 6 and the conductive substrate 5, and the interface S4 between the section 2a facing the porous oxide semiconductor layer 6 in the counter electrode 2 and the electrolyte 4. Also, a cell space 12 that is surrounded by the working electrode 1, the counter electrode 2 and the sealing portion 3, is filled with an electrolyte 4 that contains inorganic particles 4a and an electrolyte component 4b and is gelled by the inorganic particles 4a. Here, the electrolyte 4 is present in the outside as well as in the interior of the porous oxide semiconductor layer 6. The inorganic particles 4a are uniformly dispersed in the electrolyte 4. That is, the inorganic particles 4a exist between the porous oxide semiconductor layer 6 and the counter electrode 2, and between the porous oxide semiconductor layer 6 and the sealing portion 3, within the electrolyte 4. Further, the reflectance of the electrolyte 4 is larger than the reflectance of the porous oxide semiconductor layer 6.

According to the dye-sensitized solar cell 100 described above, for example, sunlight is transmitted through the conductive substrate 5 of the working electrode 1, and enters the porous oxide semiconductor layer 6. At this time, the average particle size of the entirety of the oxide semiconductor particles 6a that constitute the porous oxide semiconductor layer 6 is 100 nm or less, and the surface area of the porous oxide semiconductor layer 6 is very large. Therefore, the amount of the photosensitizing dye 11 that is supported in the porous oxide semiconductor layer 6 can be increased. Accordingly, light is sufficiently absorbed at the porous oxide semiconductor layer 6. Further, light that has not been absorbed at the porous oxide semiconductor layer 6 and has leaked from the porous oxide semiconductor layer 6, enters the electrolyte 4. At this time, since the reflectance of the electrolyte 4 is larger than the reflectance of the porous oxide semiconductor layer 6, the light that has entered the electrolyte 4 is sufficiently reflected at the electrolyte 4 and is returned to the porous oxide semiconductor layer 6. Furthermore, in the dye-sensitized solar cell 100, inorganic particles 4a exist not only between the porous oxide semiconductor layer 6 and the counter electrode 2, but also between the porous oxide semiconductor layer 6 and the sealing portion 3, in the electrolyte 4. Therefore, even the light that has leaked from the porous oxide semiconductor layer 6 to the sealing portion 3 side is also returned to the porous oxide semiconductor layer 6 by the electrolyte 4. Furthermore, the electrolyte 4 scatters the light that has been transmitted through the porous oxide semiconductor layer 6 and returns the light to the porous oxide semiconductor layer 6. Therefore, it is not necessary to provide a light reflecting particle layer that is formed on the counter electrode 2 side of the porous oxide semiconductor layer 6 by depositing high refractive index material particles, and reflects the light that has been transmitted through the porous oxide semiconductor layer 6 to be returned to the porous oxide semiconductor layer 6. Therefore, the distance between the working electrode 1 and the counter electrode 2 can be reduced. Therefore, the dye-sensitized solar cell 100 can have excellent photoelectric conversion characteristics. Furthermore, since the electrolyte 4 has been gelled by the inorganic particles 4a, fluidity of the electrolyte 4 is sufficiently decreased. Therefore, even in the case where the dye-sensitized solar cell 100 is installed such that the conductive substrate 5 is inclined with respect to the horizontal plane, unlike the case where the electrolyte 4 is liquid, uneven distribution of the inorganic particles 4a in the electrolyte 4 can be sufficiently suppressed, and the light that has been transmitted through the porous oxide semiconductor layer 6 can be reflected evenly by the electrolyte 4.

Next, the working electrode 1, photosensitizing dye 11, counter electrode 2, sealing portion 3, and electrolyte 4 will be described in detail.

(Working Electrode)

The working electrode 1 includes, as described above, a conductive substrate 5 that is capable of transmitting light, and a porous oxide semiconductor layer 6 that is provided on the conductive substrate 5. The conductive substrate 5 includes a transparent substrate 7, and a transparent conductive film 8 that is provided on the counter electrode 2 side of the transparent substrate 7 (see FIG. 1).

The material that constitutes the transparent substrate 7 may be, for example, any transparent material, and examples of such a transparent material include glasses such as borosilicate glass, soda lime glass, a glass which is made of soda lime and whose iron component is less than that of ordinary soda lime glass, and quartz glass; polyethylene terephthalate (PET), polyethylene naphthalate (PEN), polycarbonate (PC), and polyether sulfone (PES). The thickness of the transparent substrate 7 is appropriately determined depending on the size of the dye-sensitized solar cell 100 and is not particularly limited, but for example, the thickness may be adjusted to the range of 50 mm to 10,000 μm.

Examples of the material that constitutes the transparent conductive film 8 include conductive metal oxides such as indium tin oxide (ITO), tin oxide ($SnO_2$), and fluorine-doped tin oxide (FTO). The transparent conductive film 8 may be constituted of a single layer, or may be constituted of a laminate of plural layers formed from different conductive metal oxides. When the transparent conductive film 8 is constituted of a single layer, it is preferable that the transparent conductive film 8 be formed of FTO, since it has high heat resistance and high chemical resistance. Furthermore, when a laminate constituted of plural layers is used as the transparent conductive film 8, it is preferable because the characteristics of the various layers can be reflected. Above all, it is preferable to use a laminate of a layer formed of ITO and a layer formed of FTO. In this case, a transparent conductive film 8 having high electrical conductivity, heat resistance and chemical resistance can be realized. The thickness of the transparent conductive film 8 may be adjusted to, for example, 0.01 μm to 2 μm.

The porous oxide semiconductor layer 6 is composed of oxide semiconductor particles 6a. The oxide semiconductor particles 6a are formed from, for example, titanium oxide ($TiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds thereof.

The average particle size of the entirety of the oxide semiconductor particles 6a that constitute the porous oxide semiconductor layer 6 is 100 nm or less. If the average particle size of the entirety of the oxide semiconductor layer particles 6a that constitute the porous oxide semiconductor layer 6 is larger than 100 nm, the surface area of the oxide semiconductor covered by the photosensitizing dye 11 is decreased, that is, the place for carrying out photoelectric conversion is reduced, and thus the number of electrons produced decreases. Furthermore, if the average particle size of the entirety of the oxide semiconductor particles 6a that constitute the porous oxide semiconductor layer 6 is larger than 100 nm, the oxide semiconductor particles 6a themselves reflect light. Particularly, the oxide semiconductor particles reflect light having a wavelength of 400 nm to 1,000 nm, which is required by the dye-sensitized solar cell 100. Therefore, the light absorption efficiency is decreased. The average particle size of the entirety of the oxide semiconductor particles 6a is preferably 70 nm or less, more preferably 50 nm or less, and particularly preferably 40 nm or less. However, the average particle size of the entirety of the oxide semiconductor particles 6a is preferably 15 nm or greater. In this case, crystallinity is not easily impaired as compared with the case where the average particle size of the entirety of the oxide semiconductor particles 6a is less than 15 nm, and thereby, it becomes difficult to inhibit the flow of electrons.

The thickness of the porous oxide semiconductor layer 6 may be adjusted to, for example, 0.5 µm to 50 mm.

The porous oxide semiconductor layer 6 is preferably composed of a laminate that is formed by laminating oxide semiconductor particles 6a having different particle size distributions. Here, in the various layers, the average particle size of the entirety of the oxide semiconductor particles 6a is 100 nm or less. In this case, the maximum absorption wavelengths of the various layers of the laminate can be varied, and light can be absorbed evenly in the porous oxide semiconductor layer 6. Meanwhile, the porous oxide semiconductor layer 6 may also be composed of a laminate of plural semiconductor layers formed from different materials.

Furthermore, the oxide semiconductor particles 6a that constitute the porous oxide semiconductor layer 6 may also be composed of a mixture of oxide semiconductor particles having different average particle sizes.

(Photosensitizing Dye)

Examples of the photosensitizing dye 11 include ruthenium complexes having a ligand containing a bipyridine structure, a terpyridine structure or the like; and organic dyes such as porphyrin, eosin, rhodamine, and merocyanine.

(Counter Electrode)

The counter electrode 2 includes, as described above, a counter electrode substrate 9, and a conductive catalyst film (conductive layer) 10 that is provided on the working electrode 1 side of the counter electrode substrate 9 and promotes a reduction reaction at the surface of the counter electrode 2.

The counter electrode substrate 9 is composed of, for example, a corrosion resistant metal material such as titanium, nickel, platinum, molybdenum, tungsten or SUS; or a substrate obtained by forming a film formed of a conductive oxide such as ITO or FTO on the transparent substrate 7 described above. The thickness of the counter electrode substrate 9 is appropriately determined depending on the size of the dye-sensitized solar cell 100 and is not particularly limited, but for example, the thickness may be adjusted to 0.005 mm to 0.1 mm.

The catalyst layer 10 is composed of platinum, a carbon-based material, an electroconductive polymer, or the like. Here, examples of the carbon-based material include carbon black, Ketjen black, and carbon nanotubes, and among them, particularly carbon nanotubes are suitably used.

The reflectance of the counter electrode 2 may be higher than or equal to the reflectance of the electrolyte 4, or may be lower than the reflectance of the electrolyte 4; however, the dye-sensitized solar cell 100 is particularly useful in the case where the reflectance of the counter electrode 2 is lower than the reflectance of the electrolyte 4. That is, when the reflectance of the counter electrode 2 is lower than the reflectance of the electrolyte 4, the light that has entered the counter electrode 2 from the porous oxide semiconductor layer 6 through the electrolyte 4, is not sufficiently reflected at the counter electrode 2. Therefore, in the case where the inorganic particles 4a are not included in the electrolyte 4, there is almost no chance that the light reflected at the counter electrode 2 is returned again to the porous oxide semiconductor layer 6, and the counter electrode 2 hardly has a function of returning the light that has leaked from the porous oxide semiconductor layer 6 to the porous oxide semiconductor layer 6. In contrast, even if the reflectance of the counter electrode 2 is lower than the reflectance of the electrolyte 4, as long as inorganic particles 4a are included in the electrolyte 4 as in the case of the dye-sensitized solar cell 100, the light that has entered the electrolyte 4 from the porous oxide semiconductor layer 6 is effectively reflected at the electrolyte 4. Therefore, the dye-sensitized solar cell 100 is useful when the reflectance of the counter electrode 2 is lower than the reflectance of the electrolyte 4.

(Sealing Portion)

Examples of the material that constitutes the sealing portion 3 include inorganic insulating materials such as lead-free transparent low-melting point glass frits; and resins such as an ionomer, an ethylene-vinyl acetate anhydride copolymer, an ethylene-methacrylic acid copolymer, an ethylene-vinyl alcohol copolymer, an ultraviolet-curable resin, and a vinyl alcohol polymer. Meanwhile, the sealing portion 3 may be composed of a resin only, or may be composed of a resin and an inorganic filler.

(Electrolyte)

The electrolyte 4 contains an electrolyte component 4b and inorganic particles 4a, and is gelled by the inorganic particles 4a.

The electrolyte component 4b contains, for example, a redox couple such as $I^-/I_3^-$, and an organic solvent. Examples of the organic solvent that can be used include acetonitrile, methoxyacetonitrile, methoxypropionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenylacetonitrile, acrylonitrile, succinonitrile, oxalonitrile, pentanitrile, and adiponitrile. Examples of the redox couple include couples of $I^-/I_3^-$ and bromine/bromide ion. Here, the concentration of the redox couple is preferably 0.2 mol/L or higher. When the concentration of the redox couple is 0.2 mol/L or higher, it is preferable since durability against sunlight is enhanced. However, on the other hand, the color of the electrolyte 4 is darkened, and light is absorbed in the electrolyte 4. When reflection does not occur at the electrolyte 4 and reflection occurs at the counter electrode 2, since light is absorbed at the electrolyte 4 until light reaches the counter electrode 2, the amount of reflected light is decreased, and the conversion efficiency is decreased. However, in the present invention, light is reflected at the electrolyte 4. Therefore, absorption of light at the electrolyte 4 can be prevented as much as possible. Accordingly, as described above, the concentration of the redox couple is preferably 0.2 mol/L or higher. Furthermore, the electrolyte component 4b may be composed of an electrolyte component containing an ionic liquid. Examples of the ionic liquid that can be used include a normal temperature molten salt that is in a molten state at near room temperature of already known iodine salts such as pyridinium salt, imidazolium salt and triazolium salt. Examples of such a normal temperature molten salt that is suitable used include 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, and methylpropylimidazolium iodide.

Furthermore, the electrolyte component 4b may also be composed of an electrolyte component formed from a mixture of the ionic liquid described above and the organic solvent described above.

Furthermore, the electrolyte component 4b may further contain additives. Examples of the additives include LiI, $I_2$, 4-t-butylpyridine, guanidium thiocyanate, and 1-benzimidazole.

Examples of the inorganic particles 4a that can be used include oxide semiconductor particles of $SiO_2$, $TiO_2$, $SnO_2$, $WO_3$, ZnO, ITO, $BaTiO_3$, $Nb_2O_5$, $In_2O_3$, $ZrO_2$, $Ta_2O_5$, $La_2O_3$, $SrTiO_3$, $Y_2O_3$, $Ho_2O_3$, $Bi_2O_3$, $CeO_2$, and $Al_2O_3$; carbon nanotubes, and electroconductive particles of metals and the like. Among them, oxide semiconductor particles of $SiO_2$, $TiO_2$ and the like are preferred. In this case, unlike the case where the inorganic particles 4a are formed from electroconductive particles, short circuits between the working electrode 1 and the counter electrode 2 can be sufficiently prevented. Furthermore, unlike the case where the inorganic particles 4a are formed from insulating particles, the oxide semiconductor particles themselves can cause electrons to flow. That is, the oxide semiconductor particles themselves may serve as conductive paths. Therefore, the photoelectric conversion efficiency is further enhanced.

Meanwhile, the oxide semiconductor particles may also be particles doped with impurities, composite oxides, or the like.

Furthermore, when the oxide semiconductor particles are formed from $TiO_2$, the crystal form may be of rutile type or anatase type, but in view of having a high refractive index, rutile type is preferred.

Furthermore, it is preferable that the inorganic particles 4a be composed of a material that is different from that of the oxide semiconductor particles 6a used in the porous oxide semiconductor layer 6, or a crystal form that is different from that of the oxide semiconductor particles 6a. For example, when $TiO_2$ is used for the oxide semiconductor particles 6a that constitute the porous oxide semiconductor layer 6, the inorganic particles 4a are preferably formed of $SiO_2$. In this case, the photoelectric conversion characteristics can be further enhanced, as compared with the case where the inorganic particles 4a are the same oxide semiconductor particles as the oxide semiconductor particles 6a that are used in the porous oxide semiconductor layer 6 and have the same crystal form. The reason for this is not clearly known; however, the inventors of the present invention speculate that it would be because when use is made of oxide semiconductor particles that are different from the oxide semiconductor particles 6a used in the porous oxide semiconductor layer 6, the photosensitizing dye 11 adsorbed to the oxide semiconductor particles 6a used in the porous oxide semiconductor layer 6 does not migrate to the inorganic particles 4a, and a decrease in the amount of the photosensitizing dye 11 in the porous oxide semiconductor layer 6 is sufficiently suppressed.

Furthermore, for example, when $TiO_2$ which contains anatase type $TiO_2$ as a main component is used for the oxide semiconductor particles 6a that constitute the porous oxide semiconductor layer 6, it is preferable that the inorganic particles 4a be composed of rutile type $TiO_2$. In this case, the photoelectric conversion characteristics can be further enhanced, as compared with the case where the inorganic particles 4a are the same oxide semiconductor particles as the oxide semiconductor particles 6a that are used in the porous oxide semiconductor layer 6 and have the same crystal form. The reason for this is not clearly known; however, the inventors of the present invention speculate that it would be because when the material or crystal form is different, the photosensitizing dye 11 adsorbed to the oxide semiconductor particles 6a used in the porous oxide semiconductor layer 6 does not migrate to the inorganic particles 4a, and a decrease in the amount of the photosensitizing dye 11 in the porous oxide semiconductor layer 6 is sufficiently suppressed.

The average particle size of the inorganic particles 4a is not particularly limited as long as the particle size is capable of reflecting light that has been transmitted through the porous oxide semiconductor layer 6. The average particle size of the inorganic particles 4a is preferably 5 nm to 1000 nm, more preferably 10 nm to 400 nm, and even more preferably 10 nm to 100 nm. When the average particle size of the inorganic particles 4a is in the range described above, the reflection efficiency for visible light and near-infrared light is further increased.

It is preferable that the inorganic particles 4a be composed of two or more kinds of inorganic particles 4a having different average particle sizes. In this case, since the inorganic particles 4a having a smaller average particle size sufficiently fill in the gaps between the inorganic particles 4a having a larger average particle size, light that has entered the electrolyte 4 from the porous oxide semiconductor layer 6 is fully reflected and is thereby returned to the porous oxide semiconductor layer 6. Furthermore, since inorganic particles 4a having different average particle sizes are included in the electrolyte 4, light having wavelengths that respectively correspond to the average particle sizes of the inorganic particles 4a can be sufficiently reflected.

The reflectance of the electrolyte 4 is larger than the reflectance of the porous oxide semiconductor layer 6, as described above. Here, the reflectance of the electrolyte 4 may be higher than the reflectance of the porous oxide semiconductor layer 6, but the difference between the reflectance of the electrolyte 4 and the reflectance of the porous oxide semiconductor layer 6 is preferably 10% to 70%, more preferably 20% to 70%, and even more preferably 30% to 50%. When the difference between the reflectance of the electrolyte 4 and the reflectance of the porous oxide semiconductor layer 6 is in the range described above, superior photoelectric conversion characteristics are obtained as compared with the case where the difference in reflectance is not in the range described above.

The reflectance of the electrolyte 4 can be adjusted by, for example, changing the material of the inorganic particles 4a, and the content of the inorganic particles 4a in the electrolyte 4. For example, when $SiO_2$ is used for the inorganic particles 4a, the reflectance of the electrolyte 4 can be increased. The reflectance of the electrolyte 4 can also be increased by increasing the content of the inorganic particles 4a in the electrolyte 4. Here, in the case of using $TiO_2$ for the porous oxide semiconductor layer 6 and using $SiO_2$ for the inorganic particles 4a, if the content of the inorganic particles 4a in the electrolyte 4 is adjusted to 10% by mass or more, the reflectance of the electrolyte 4 can be made higher than the reflectance of the porous oxide semiconductor layer 6. The content of the inorganic particles 4a in the electrolyte 4 is preferably 10% to 90% by mass, more preferably 20% to 70% by mass, and even more preferably 30% to 70% by mass. When the content of the inorganic particles 4a in the electrolyte 4 is in the range described above, superior photoelectric conversion characteristics are obtained, as compared with the case where the content is not in the range described above.

Next, the method for producing the dye-sensitized solar cell 100 will be described.

<Working Electrode Forming Process>

First, a working electrode 1 is prepared as follows.

First, a transparent conductive film 8 is formed on a transparent substrate 7, and thus a conductive substrate 5 having transparency is prepared. As the method for forming a transparent conductive film 8, a sputtering method, a vapor deposition method, a spray pyrolysis deposition method (SPD), a CVD method and the like are used.

(Porous Oxide Semiconductor Layer Forming Process)

Next, a paste for forming a porous oxide semiconductor layer is printed on the transparent conductive film 8. The paste for forming a porous oxide semiconductor layer contains, in addition to the oxide semiconductor particles 6a described above, a resin such as polyethylene glycol and a solvent such as terpineol. As the method for printing the paste for forming a porous oxide semiconductor layer, for example, a screen printing method, a doctor blade method, a bar coating method or the like can be used. At this time, as the oxide semiconductor particles 6a, particles having an average particle size of 100 nm or less are used.

Next, the paste for forming a porous oxide semiconductor layer is calcined, and thereby a porous oxide semiconductor layer 6 is formed on the transparent conductive film 8. The calcination temperature may vary with the material of the oxide semiconductor particles 6a, but the calcination temperature is usually 350° C. to 600° C. The calcination time may also vary with the material of the oxide semiconductor particles 6a, but the calcination time is usually 1 hour to 5 hours.

In this manner, a working electrode 1 is obtained.

<Dye Supporting Process>

Next, a photosensitizing dye 11 is supported in the porous oxide semiconductor layer 6 of the working electrode 1. To this end, a photosensitizing dye 11 may be adsorbed to the porous oxide semiconductor layer 6 by immersing the working electrode 1 in a solution containing the photosensitizing dye 11, adsorbing the photosensitizing dye 11 to the porous oxide semiconductor layer 6, subsequently washing away any excess photosensitizing dye 11 with the solvent component of the solution, and drying the working electrode. However, even if the photosensitizing dye 11 is adsorbed to the porous oxide semiconductor layer 6 by applying a solution containing the photosensitizing dye 11 on the porous oxide semiconductor layer 6 and then drying the solution, the photosensitizing dye 11 can be supported in the porous oxide semiconductor layer 6.

<Counter Electrode Preparation Process>

On the other hand, a counter electrode 2 is prepared as follows.

First, a counter electrode substrate 9 is prepared. A catalyst layer 10 is formed on the counter electrode substrate 9. As the method for forming the catalyst layer 10, a sputtering method, a screen printing method, a vapor deposition method, or the like is used. Among these, a sputtering method is preferred from the viewpoint of the uniformity of the film.

<Sealing Portion Fixing Process>

Next, an annular sheet formed from, for example, a thermoplastic resin is prepared. This sheet is mounted on the working electrode 1 having the porous oxide semiconductor layer 6 in which the photosensitizing dye 11 is supported, and the sheet is heated to melt. At this time, the annular sheet is mounted such that the porous oxide semiconductor layer 6 is disposed on the inner side of the annular sheet. In this manner, the annular resin sheet is fixed to the surface of the working electrode 1.

<Electrolyte Disposition Process>

Then, an electrolyte 4 is prepared. First, an electrolyte component 4b and inorganic particles 4a are prepared. Here, as the inorganic particles 4a, the materials for inorganic particles 4a described above are used. The inorganic particles 4a are added to the electrolyte component 4b, and the mixture is sequentially subjected to, for example, a centrifugation treatment and a kneading treatment. Thereby, an electrolyte 4 that has been gelled can be obtained.

The electrolyte 4 is disposed on the inner side of the sealing portion 3 provided on the working electrode 1. At this time, the reflectance of the electrolyte 4 is adjusted to be higher than the reflectance of the porous oxide semiconductor layer 6. In order to make the reflectance of the electrolyte 4 higher than the reflectance of the porous oxide semiconductor layer 6, for example, the content of the inorganic particles 4a in the electrolyte 4 may be increased. The electrolyte 4 can be disposed by, for example, a printing method such as screen printing. At this time, on the counter electrode 2 side of the porous oxide semiconductor layer 6, a light reflecting particle layer that is formed by depositing a high refractive index material is not provided. Therefore, the electrolyte 4 can easily penetrate into the porous oxide semiconductor layer 6.

<Sealing Process>

After the electrolyte 4 is disposed on the working electrode 1, the counter electrode 2 is superimposed on the working electrode 1 such that the electrolyte 4 is interposed between the working electrode 1 and the counter electrode 2, and the annular resin sheet is heated to melt. Thereby, the working electrode 1 and the counter electrode 2 are bonded. In this manner, the dye-sensitized solar cell 100 is obtained, and the production of the dye-sensitized solar cell 100 is completed.

The present invention is not intended to be limited to the embodiments described above. For example, in the embodiment described above, the distance L1 between the conductive substrate 5 and the counter electrode 2 in the sealing portion 3 is the same as the distance L2 between the conductive substrate 5 and the counter electrode 2 in the porous oxide semiconductor layer 6, but it is not necessarily required that the distance L1 between the conductive substrate 5 and the counter electrode 2 in the sealing portion 3 be the same as the distance L2 between the conductive substrate 5 and the counter electrode 2 in the porous oxide semiconductor layer 6. For example, as in the case of the dye-sensitized solar cell 200 illustrated in FIG. 4 and FIG. 5, the distance L2 between the conductive substrate 5 and the counter electrode 2 in the porous oxide semiconductor layer 6 may be shorter than the distance L1 between the conductive substrate 5 and the counter electrode 2 in the sealing portion 3. Such a dye-sensitized solar cell 200 can be obtained when, for example, the counter electrode 2 is flexible. In order to impart flexibility to the counter electrode 2, for example, the thickness of the counter electrode substrate 9 may be set to 0.005 mm to 0.1 mm. In order to obtain the dye-sensitized solar cell 200, a sealing process for encapsulating the electrolyte 4 by bonding the working electrode 1 and the counter electrode 2 by means of an annular resin sheet may be carried out under reduced pressure, and then the external pressure of the dye-sensitized solar cell 200 may be returned to atmospheric pressure. In this case, since the cell space is brought a negative pressure state with respect to the outside air, the counter electrode 2 bends to become convex toward the working electrode 1 side. Therefore, a dye-sensitized solar cell 200 can be obtained. Meanwhile, the sealing process may be carried out, for example, as follows.

That is, first, in a container for depressurization having an opening, the working electrode 1 on which an annular resin sheet has been fixed is accommodated through the opening. Subsequently, the electrolyte 4 is injected into the inner side of the annular resin sheet. Thereafter, the counter electrode 2 is further accommodated inside the container for depressurization, and the working electrode 1 and the counter electrode 2 are arranged to face each other inside the container for depressurization. Next, the opening of the container for depressurization is blocked with, for example, a flexible sheet formed from a resin such as PET, and a tightly sealed space is formed inside the container for depressurization. Then, the sealed space is depressurized using, for example, a vacuum pump through an exhaust hole (not shown in the diagram) formed in the container for depressurization.

At this time, the counter electrode 2 is pressed by the flexible sheet. Along with this, the annular resin sheet is interposed between the working electrode 1 and the counter electrode 2 and is pressed. At this time, when the container for depressurization is heated, and the annular sheet is caused to melt under pressure, a sealing portion 3 that connects the working electrode 1 and the counter electrode 2 is formed between these electrodes.

Furthermore, the air pressure inside the container for depressurization during the sealing process is preferably lower than 101325 Pa at 25° C.

When the air pressure inside the container for depressurization during the sealing process is lower than 101325 Pa at 25° C., usually, in the dye-sensitized solar cell 200 thus obtainable, the internal pressure of the cell space 12 usually becomes lower than 101325 Pa at 25° C., and the cell space is brought to a negative pressure state with respect to the outside air. At this time, if the counter electrode 2 is flexible, the counter electrode 2 bends to become convex toward the working electrode 1 side, and the distance L2 between the counter electrode 2 and the working electrode 1 can be further reduced. Therefore, the photoelectric conversion efficiency can be further increased.

The air pressure inside the container for depressurization during the sealing process at 25° C., that is, the internal pressure of the cell space 12 at 25° C., is more preferably 1000 Pa or less, and even more preferably 600 Pa or less. In this case, the photoelectric conversion efficiency can be further increased, as compared with the case where the internal pressure of the cell space 12 is not in the range described above.

In the dye-sensitized solar cell 200, since the distance L2 between the conductive substrate 5 and the counter electrode 2 in the porous oxide semiconductor layer 6, which contributes to power generation, is shorter than the distance L1 between the conductive substrate 5 and the counter electrode 2 in the sealing portion 3, superior photoelectric conversion characteristics is obtained. Meanwhile, even in this case, when the content of the inorganic particles 4a in the electrolyte 4 is increased, the reflectance of the electrolyte 4 can be made higher than the reflectance of the porous oxide semiconductor layer 6.

Figure 4:
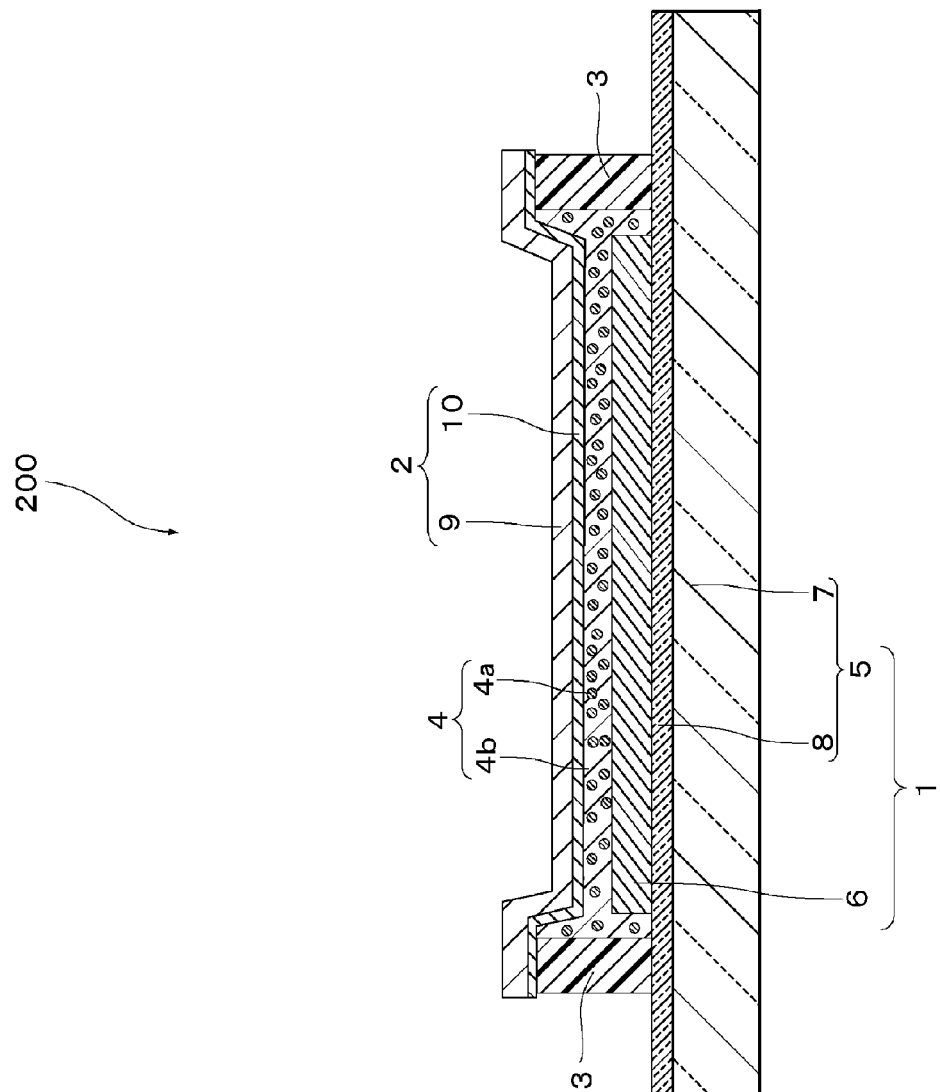
FIG. 4 is a cross-sectional diagram illustrating another embodiment of the dye-sensitized solar cell of the present invention.
Figure 5:
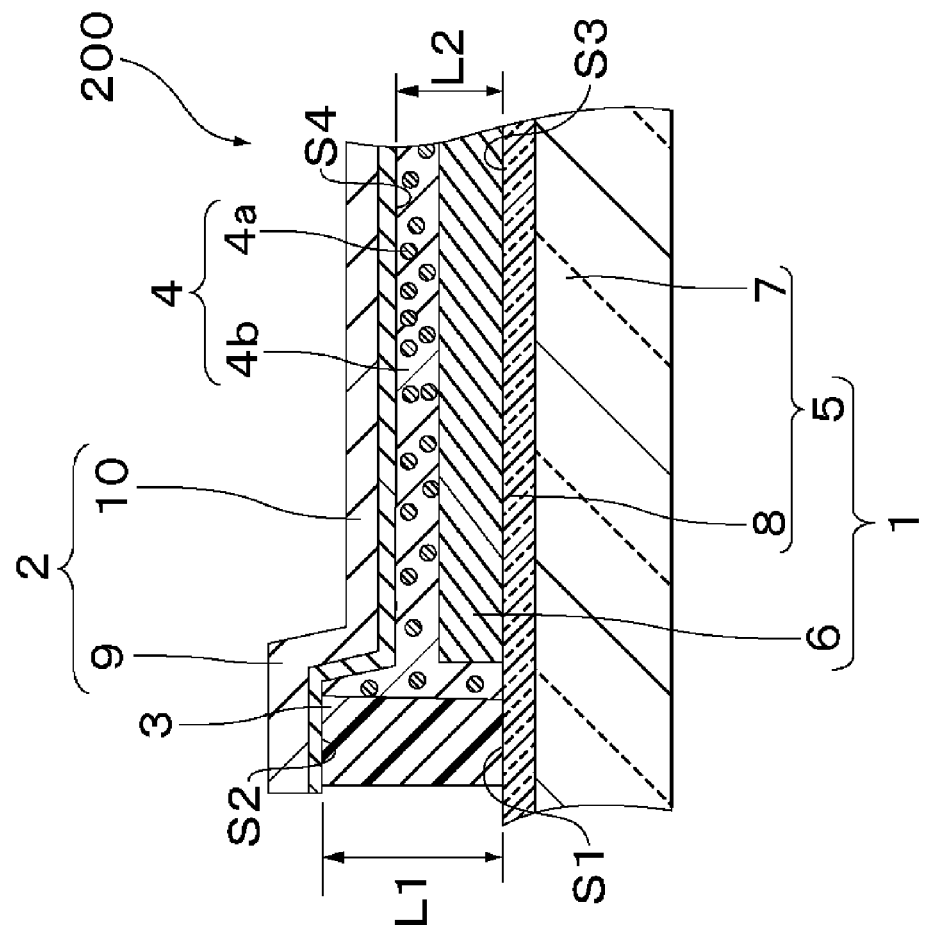
FIG. 5 is a diagram illustrating a portion of the dye-sensitized solar cell of FIG. 4.

Furthermore, it is not necessarily the case that the dye-sensitized solar cell 200 illustrated in FIG. 4 and FIG. 5, that is, the dye-sensitized solar cell 200 in which the section 2a facing the porous oxide layer 6 in the counter electrode 2 protrudes to become convex toward the porous oxide semiconductor layer 6 side, may be realized only in the case where the counter electrode 2 is flexible. That is, even if the counter electrode 2 is not flexible, when the counter electrode substrate 9 is machined and the catalyst layer 10 is formed thereon, the dye-sensitized solar cell 200 illustrated in FIG. 4 and FIG. 5 can be realized.

EXAMPLES

Hereinafter, the content of the present invention will be more specifically described by way of Examples, but the present invention is not intended to be limited to the Examples described below.

Example 1

Production of Working Electrode

First, an FTO/glass substrate in which an FTO film was formed on a glass substrate was prepared. This FTO/glass substrate was washed, and this substrate was subjected to a UV-$O_3$ treatment. A titanium oxide nanoparticle paste (PST-21NR manufactured by JGC C&C) containing titanium oxide particles having an average particle size of 20 nm was applied on the substrate by screen printing, and thus a film having a size of 50 mm×50 mm×0.01 mm (10 μm) was produced. Thus, a film substrate was obtained. Thereafter, this film substrate was placed in an oven, and the film was calcined for one hour at 500° C. to form a porous oxide semiconductor layer having a size of 50 mm×50 mm×10 μm on the FTO film. Thus, a working electrode was obtained.

(Supporting of Photosensitizing Dye)

Next, N719 dye, which is a photosensitizing dye, was dissolved in a mixed solvent prepared by mixing acetonitrile and t-butyl alcohol at a ratio of 1:1 (volume ratio), and thus a dye solution was prepared. The working electrode was immersed in this dye solution for 24 hours, and thereby, the photosensitizing dye was supported in the porous oxide semiconductor layer.

(Production of Counter Electrode)

On the other hand, a titanium substrate having a thickness of 40 μm was prepared, and Pt was deposited on this substrate according to a sputtering method. In this manner, a counter electrode was obtained. Meanwhile, a sheet-like counter electrode having a dimension of 50 mm×200 mm and having the same thickness as that of the counter electrode obtained as described above, was prepared separately, and the maximum deformation ratio in an environment at 20° C. was measured. The maximum deformation ratio was 70%. Therefore, it was found that the counter electrode thus obtained was flexible.

(Production of Sealing Portion)

Next, an annular thermoplastic resin sheet formed from HIMILAN (trade name, manufactured by DuPont-Mitsui Polychemical Co., Ltd.), which is an ionomer, was disposed on the working electrode. At this time, the resin sheet was disposed such that the porous oxide semiconductor layer would be disposed on the inner side of the annular thermoplastic resin sheet. The thermoplastic resin sheet was heated to melt at 180° C. for 5 minutes, and thereby the resin sheet was bonded to the working electrode.

(Disposition of Electrolyte)

On the other hand, an electrolyte precursor was prepared by adding $I_2$, guanidium thiocyanate and 1-benzimidazole to 1-hexyl-3-methylimidazolium iodide. Then, to this electrolyte precursor, nanoparticles formed of titanium oxide ($TiO_2$)

and having an average particle size of 70 nm were added. At this time, the nanoparticles of $TiO_2$ were added such that when the total weight proportion of the electrolyte precursor and the $TiO_2$ nanoparticles was designated as 100% by mass, the proportion of the nanoparticles would be 5% by mass. The mixture was sequentially subjected to a centrifugation treatment and a kneading treatment to achieve gelation, and thus an electrolyte was obtained. When the centrifugation treatment and the kneading treatment were carried out in sequence, the proportion of the nanoparticles of $TiO_2$ reached 60% by mass when the weight proportion of the entirety of the electrolyte was designated as 100% by mass. The electrolyte thus obtained was applied on the working electrode supporting the photosensitizing dye by a screen printing method, so as to cover the porous oxide semiconductor layer.

(Sealing)

The counter electrode was superimposed with the working electrode such that the electrolyte would be interposed between the working electrode and the counter electrode, and the sealing portion was heated to melt under reduced pressure (1,000 Pa) to thereby bond the counter electrode and the sealing portion. At this time, the thickness of the electrolyte, that is, the distance between the porous oxide semiconductor layer and the counter electrode, was 20 µm. Furthermore, the distance (space) L2 between the FTO/glass substrate and the counter electrode in the porous oxide semiconductor layer was 30 µm. Furthermore, the distance L1 between the FTO/glass substrate and the counter electrode in the sealing portion was 60 µm, and the value of L1−L2 was 30 µm. In this manner, a dye-sensitized solar cell was obtained.

Meanwhile, the reflectance values of the porous oxide semiconductor layer having a thickness of 10 µm and the electrolyte having a thickness of 20 µm were measured using a UV-Vis apparatus. Specifically, the measurement of the reflectance of the porous semiconductor layer was carried out using a porous semiconductor layer formed on an FTO/glass substrate, and the measurement of the reflectance of the gelled electrolyte was carried out using an electrolyte that had been formed on an FTO/glass substrate to a thickness of 20 µm. The results are presented in Table 1. As indicated in Table 1, the reflectance of the electrolyte was higher than the reflectance of the porous oxide semiconductor layer. Furthermore, the reflectance of the counter electrode was measured, and it was found that the reflectance of the counter electrode was higher than the reflectance of the electrolyte, as indicated in Table 1.

Example 2

A dye-sensitized solar cell was produced in the same manner as in Example 1, except that nanoparticles formed from silica ($SiO_2$) and having an average particle size of 12 nm were used instead of the $TiO_2$ nanoparticles as the inorganic particles that are incorporated into the electrolyte.

Meanwhile, the reflectance values of the porous oxide semiconductor layer having a thickness of 10 µm and the electrolyte having a thickness of 20 µm were measured in the same manner as in Example 1. The results are presented in Table 1. As indicated in Table 1, the reflectance of the electrolyte was higher than the reflectance of the porous oxide semiconductor layer.

Example 3

A dye-sensitized solar cell was produced in the same manner as in Example 1, except that a carbon nanotube electrode was used as the counter electrode.

The above-mentioned carbon nanotube electrode was obtained by forming a carbon nanotube film having a thickness of 10 µm on a substrate formed of titanium and having a thickness of 40 µm by a CVD method. Here, the carbon nanotube film was obtained by mounting the substrate in an apparatus equipped with a vacuum chamber capable of generating plasma, and treating the substrate at 580° C. and 2,600 Pa for 0.16 hours (10 minutes) while introducing a raw material gas composed of hydrogen.

Meanwhile, the reflectance values of the porous oxide semiconductor layer having a thickness of 10 µm and the electrolyte having a thickness of 20 µm were the same as in the case of Example 1, as indicated in Table 1. That is, as indicated in Table 1, the reflectance of the electrolyte was higher than the reflectance of the porous oxide semiconductor layer. Furthermore, the reflectance of the carbon nanotube electrode was measured in the same manner as in Example 1, and it was confirmed that the reflectance of the carbon nanotube electrode was lower than the reflectance of the electrolyte.

Examples 4 to 19

Dye-sensitized solar cells were produced in the same manner as in Example 1, except that the average particle size of the entirety of the semiconductor particles that constituted the porous oxide semiconductor layer, the reflectance R1 of the porous oxide semiconductor layer, the reflectance R2 of the electrolyte, R2−R1, the material, average particle size and reflectance in the electrolyte of the inorganic particles in the electrolyte, the reflectance, configuration, the presence or absence of flexibility of the counter electrode, and L1−L2 were changed as indicated in Tables 1 to 3.

Comparative Example 1

A dye-sensitized solar cell was produced in the same manner as in Example 1, except that titanium oxide as inorganic particles was not incorporated into the electrolyte.

Meanwhile, the reflectance values of the porous oxide semiconductor layer having a thickness of 10 µm and the electrolyte having a thickness of 20 µm were measured in the same manner as in Example 1. The results are presented in Table 3. As indicated in Table 3, the reflectance of the electrolyte was lower than or equal to the reflectance of the porous oxide semiconductor layer.

Comparative Example 2

A dye-sensitized solar cell was produced in the same manner as in Example 3, except that titanium oxide as inorganic particles was not incorporated into the electrolyte.

Meanwhile, the reflectance values of the porous oxide semiconductor layer having a thickness of 10 µm and the electrolyte having a thickness of 20 µm were measured in the same manner as in Example 1. The average value of the reflectance values in 400 nm to 1000 nm was calculated. As a result, the reflectance of the electrolyte was lower than or equal to the reflectance of the porous oxide semiconductor layer.

Comparative Example 3

A dye-sensitized solar cell was produced in the same manner as in Example 3, except that a light reflecting particle layer having a thickness of 8 µm and formed from titanium oxide particles having an average particle size of 400 nm was provided on the counter electrode side on the porous oxide semiconductor layer, instead of incorporating inorganic particles into the electrolyte.

Meanwhile, the reflectance values of the porous oxide semiconductor layer having a thickness of 10 μm, the electrolyte having a thickness of 20 μm, and the light reflecting particle layer having a thickness of 8 μm were measured in the same manner as in Example 1. The results are presented in Table 3. As indicated in Table 3, the reflectance of the electrolyte was lower than or equal to the reflectance of the porous oxide semiconductor layer. Furthermore, the reflectance of the light reflecting particle layer was higher than the reflectance of the porous oxide semiconductor layer.

Comparative Example 4

A dye-sensitized solar cell was produced in the same manner as in Example 1, except that the electrolyte was not gelled by changing the content of the inorganic particles in the electrolyte as indicated in Table 3.

For the dye-sensitized solar cells of Examples 1 to 19 and Comparative Examples 1 to 4 obtained as described above, the photoelectric conversion efficiency, η (%), was measured. The results are presented in Tables 1 to 3.

TABLE 1

| | Average particle size of entirety of semiconductor particles (nm) | Reflectance R1 of oxide semiconductor layer (%) | Reflectance R2 of electrolyte (%) | R2 − R1 (%) | Inorganci particles in electrolyte | | |
|---|---|---|---|---|---|---|---|
| | | | | | Material | Average particle size (nm) | Content in electrolyte (mass %) |
| Example 1 | 20 | 8.62 | 57.2 | 48.58 | TiO$_2$ | 70 | 60 |
| Example 2 | 20 | 8.62 | 41.6 | 32.98 | SiO$_2$ | 12 | 60 |
| Example 3 | 20 | 8.62 | 57.2 | 48.58 | TiO$_2$ | 70 | 60 |
| Example 4 | 50 | 17.23 | 41.6 | 24.37 | SiO$_2$ | 70 | 60 |
| Example 5 | 90 | 40.11 | 41.6 | 1.49 | SiO$_2$ | 70 | 60 |
| Example 6 | 20 | 8.62 | 23.62 | 15 | TiO$_2$ | 70 | 20 |
| Example 7 | 20 | 8.62 | 38.62 | 30 | TiO$_2$ | 70 | 50 |
| Example 8 | 20 | 8.62 | 68.62 | 60 | TiO$_2$ | 70 | 80 |

| | Counter electrode | | | | Reflectance of light reflecting layer (%) | η (%) |
|---|---|---|---|---|---|---|
| | Reflectance (%) | Configuration | Presence or absence of flexibility | L1-L2 (μm) | | |
| Example 1 | 96 | Titanium/Pt | Present | 30 | — | 6.45 |
| Example 2 | 96 | Titanium/Pt | Present | 30 | — | 6.45 |
| Example 3 | 3 | Titanium/CNT | Present | 30 | — | 6.44 |
| Example 4 | 96 | Titanium/Pt | Present | 30 | — | 6.01 |
| Example 5 | 96 | Titanium/Pt | Present | 30 | — | 6.03 |
| Example 6 | 96 | Titanium/Pt | Present | 30 | — | 6.05 |
| Example 7 | 96 | Titanium/Pt | Present | 30 | — | 6.31 |
| Example 8 | 96 | Titanium/Pt | Present | 30 | — | 6.11 |

TABLE 2

| | Average particle size of entirety of semiconductor particles (nm) | Reflectance R1 of oxide semiconductor layer (%) | Reflectance R2 of electrolyte (%) | R2 − R1 (%) | Inorganci particles in electrolyte | | |
|---|---|---|---|---|---|---|---|
| | | | | | Material | Average particle size (nm) | Content in electrolyte (mass %) |
| Example 9 | 20 | 8.62 | 32 | 23.38 | SiO$_2$ | 7 | 60 |
| Example 10 | 20 | 8.62 | 48 | 39.38 | SiO$_2$ | 50 | 60 |
| Example 11 | 20 | 8.62 | 56 | 47.38 | SiO$_2$ | 100 | 60 |
| Example 12 | 20 | 8.62 | 57 | 48.38 | TiO$_2$ | 300 | 60 |
| Example 13 | 20 | 8.62 | 57 | 48.38 | TiO$_2$ | 600 | 60 |
| Example 14 | 20 | 8.62 | 57 | 48.38 | TiO$_2$ | 900 | 60 |
| Example 15 | 20 | 8.62 | 57.1 | 48.48 | TiO$_2$ | 20 / 60 | 60 |
| Example 16 | 20 | 8.62 | 56.5 | 47.88 | SiO$_2$ / TiO$_2$ | 12 / 70 | 30 / 30 |

TABLE 2-continued

| | Counter electrode | | | | Reflectance of light reflecting layer (%) | η (%) |
|---|---|---|---|---|---|---|
| | Reflectance (%) | Configuration | Presence or absence of flexibility | L1-L2 (μm) | | |
| Example 9 | 96 | Titanium/Pt | Present | 30 | — | 6.12 |
| Example 10 | 96 | Titanium/Pt | Present | 30 | — | 6.21 |
| Example 11 | 96 | Titanium/Pt | Present | 30 | — | 6.33 |
| Example 12 | 96 | Titanium/Pt | Present | 30 | — | 6.13 |
| Example 13 | 96 | Titanium/Pt | Present | 30 | — | 6.07 |
| Example 14 | 96 | Titanium/Pt | Present | 30 | — | 6.00 |
| Example 15 | 96 | Titanium/Pt | Present | 30 | — | 6.09 |
| Example 16 | 96 | Titanium/Pt | Present | 30 | — | 6.23 |

TABLE 3

| | Average particle size of entirety of semiconductor particles (nm) | Reflectance R1 of oxide semiconductor layer (%) | Reflectance R2 of electrolyte (%) | R2 – R1 (%) | Inorganic particles in electrolyte | | |
|---|---|---|---|---|---|---|---|
| | | | | | Material | Average particle size (nm) | Content in electrolyte (mass %) |
| Example 17 | 20 | 8.62 | 55.8 | 47.18 | SiO$_2$ | 70 | 30 |
| | | | | | TiO$_2$ | 12 | 30 |
| Example 18 | 20 | 8.62 | 57.2 | 48.58 | TiO$_2$ | 70 | 60 |
| Example 19 | 20 | 8.62 | 57.2 | 48.58 | TiO$_2$ | 70 | 60 |
| Comparative Example 1 | 20 | 8.62 | 8.62 or less | 0 or less | — | — | 0 |
| Comparative Example 2 | 20 | 8.62 | 8.62 or less | 0 or less | — | — | 0 |
| Comparative Example 3 | 20 | 8.62 | 8.62 or less | 0 or less | — | — | 0 |
| Comparative Example 4 | 20 | 8.62 | 8.62 or less | 0 or less | TiO$_2$ | 70 | 0.5 |

| | Counter electrode | | | | Reflectance of light reflecting layer (%) | η (%) |
|---|---|---|---|---|---|---|
| | Reflectance (%) | Configuration | Presence or absence of flexibility | L1-L2 (μm) | | |
| Example 17 | 96 | Titanium/Pt | Present | 30 | — | 6.19 |
| Example 18 | 96 | Titanium/Pt | Absent | 0 | — | 6.01 |
| Example 19 | 96 | SUS/Pt | Present | 30 | — | 6.41 |
| Comparative Example 1 | 96 | Titanium/Pt | Present | 30 | — | 5.05 |
| Comparative Example 2 | 3 | Titanium/CNT | Present | 30 | — | 5.01 |
| Comparative Example 3 | 3 | Titanium/CNT | Present | 22 | 52.5 | 5.61 |
| Comparative Example 4 | 96 | Titanium/Pt | Present | 30 | — | 5.15 |

From the results disclosed in Table 1, it was found that the dye-sensitized solar cells of Examples 1 to 19 had superior photoelectric conversion characteristics compared with the dye-sensitized solar cells of Comparative Examples 1 to 4.

Therefore, it was confirmed that according to the dye-sensitized solar cell of the present invention, excellent photoelectric conversion characteristics can be obtained.

EXPLANATIONS OF REFERENCE NUMERALS

1 WORKING ELECTRODE
2 COUNTER ELECTRODE
4 ELECTROLYTE
4a INORGANIC PARTICLES
4b ELECTROLYTE COMPONENT
5 CONDUCTIVE SUBSTRATE

6 POROUS OXIDE SEMICONDUCTOR LAYER
6a OXIDE SEMICONDUCTOR PARTICLES
11 PHOTOSENSITIZING DYE
12 CELL SPACE
100, 200 DYE-SENSITIZED SOLAR CELL
L1 DISTANCE BETWEEN CONDUCTIVE SUBSTRATE AND COUNTER ELECTRODE IN SEALING PORTION
L2 DISTANCE BETWEEN CONDUCTIVE SUBSTRATE AND COUNTER ELECTRODE IN POROUS OXIDE SEMICONDUCTOR LAYER

The invention claimed is:

1. A dye-sensitized solar cell comprising:
a working electrode comprising a conductive substrate that is capable of transmitting light, and a porous oxide semiconductor layer that is provided on the conductive substrate;
a counter electrode that is provided to face the porous oxide semiconductor layer of the working electrode;
a photosensitizing dye that is supported in the porous oxide semiconductor layer of the working electrode; and
an electrolyte that is disposed between the working electrode and the counter electrode,
wherein the average particle size of the entirety of the semiconductor particles that constitute the porous oxide semiconductor layer is 100 nm or less,
the electrolyte contains inorganic particles and is gelled by the inorganic particles, and
the reflectance of the electrolyte is higher than the reflectance of the porous oxide semiconductor layer.

2. The dye-sensitized solar cell according to claim 1, wherein the reflectance of the counter electrode is lower than the reflectance of the electrolyte.

3. The dye-sensitized solar cell according to claim 1, wherein the semiconductor particles that constitute the porous oxide semiconductor layer, are oxide semiconductor particles, and these oxide semiconductor particles comprise a material that is different from that of the inorganic particles, or a crystal form that is different from that of the inorganic particles.

4. The dye-sensitized solar cell according to claim 1, wherein the inorganic particles comprise oxide semiconductor particles.

5. The dye-sensitized solar cell according to claim 1, wherein the average particle size of the inorganic particles is 5 nm to 1,000 nm.

6. The dye-sensitized solar cell according to claim 5, wherein the average particle size of the inorganic particles is 10 nm to 400 nm.

7. The dye-sensitized solar cell according to claim 1, wherein the content of the inorganic particles in the electrolyte is 10% to 90% by mass.

8. The dye-sensitized solar cell according to claim 7, wherein the content of the inorganic particles in the electrolyte is 30% to 70% by mass.

9. The dye-sensitized solar cell according to claim 1, wherein the electrolyte comprises two or more kinds of inorganic particles having different average particle sizes.

10. The dye-sensitized solar cell according to claim 1, wherein the difference between the reflectance of the electrolyte and the reflectance of the porous oxide semiconductor layer is 10% to 70%.

11. The dye-sensitized solar cell according to claim 1, wherein the semiconductor particles that constitute the porous oxide semiconductor layer are formed of titanium oxide, and the inorganic particles are formed of silica.

12. The dye-sensitized solar cell according to claim 1, wherein the dye-sensitized solar cell further comprises a sealing portion that connects the working electrode and the counter electrode around the electrolyte, and
the distance between the conductive substrate and the counter electrode in the porous oxide semiconductor layer is shorter than the distance between the conductive substrate and the counter electrode in the sealing portion.

13. The dye-sensitized solar cell according to claim 1, wherein the counter electrode is flexible.

14. The dye-sensitized solar cell according to claim 13, wherein the dye-sensitized solar cell further comprises a sealing portion that connects the working electrode and the counter electrode around the electrolyte, and
the internal pressure of the cell space formed by the working electrode, the counter electrode, and the sealing portion is lower than 101325 Pa at 25° C.

* * * * *